US012429170B2

(12) United States Patent
Lacapere

(10) Patent No.: US 12,429,170 B2
(45) Date of Patent: Sep. 30, 2025

(54) SYSTEM FOR STORING LIQUID HYDROGEN AND FOR DISTRIBUTING PRESSURISED GASEOUS HYDROGEN

(71) Applicant: ABSOLUT SYSTEM, Seyssinet-Pariset (FR)

(72) Inventor: Jerome Lacapere, St Etienne de Crossey (FR)

(73) Assignee: ABSOLUT SYSTEM, Seyssinet-Pariset (FR)

( * ) Notice: Subject to any disclaimer, the term of this patent is extended or adjusted under 35 U.S.C. 154(b) by 151 days.

(21) Appl. No.: 18/565,105

(22) PCT Filed: Jun. 8, 2022

(86) PCT No.: PCT/FR2022/051087
§ 371 (c)(1),
(2) Date: Nov. 29, 2023

(87) PCT Pub. No.: WO2022/258924
PCT Pub. Date: Dec. 15, 2022

(65) Prior Publication Data

US 2024/0263744 A1 Aug. 8, 2024

(30) Foreign Application Priority Data

Jun. 8, 2021 (FR) ........................................ 2106014

(51) Int. Cl.
*F17C 5/06* (2006.01)
*F17C 5/00* (2006.01)

(52) U.S. Cl.
CPC ................ *F17C 5/06* (2013.01); *F17C 5/007* (2013.01); *F17C 2201/0109* (2013.01);
(Continued)

(58) Field of Classification Search
CPC .... F17C 5/06; F17C 5/007; F17C 2201/0109; F17C 2201/035; F17C 2201/056;
(Continued)

(56) References Cited

U.S. PATENT DOCUMENTS

2018/0346313 A1 12/2018 Feng
2020/0095113 A1 3/2020 Crispel
(Continued)

OTHER PUBLICATIONS

French Search Report in co-pending, related French Application No. FR 2106014, mailed Feb. 25, 2022.
(Continued)

*Primary Examiner* — Samir Abdosh
(74) *Attorney, Agent, or Firm* — Thomas | Horstemeyer, LLP

(57) ABSTRACT

The invention relates to a system for storing liquid hydrogen and for distributing gaseous hydrogen, comprising a source of liquid hydrogen (20), at least two gaseous hydrogen tanks (31-35) to be filled and a transfer device comprising: a transfer unit (25) configured to transfer liquid hydrogen from the hydrogen source (20) to any of the tanks, a vapour compressor (10) having a first upstream end and a second downstream end fluidly connected to each of the tanks, a set of valves (51-55), a control device configured to issue a command to transfer the liquid hydrogen and to open and/or close one or more valves (51-55), the compressor (10) being arranged so as to transfer vapours created during filling from any tank to each of the other tanks in succession, by compressing the vapors to a pressure greater than the pressure in the tank during filling.

8 Claims, 1 Drawing Sheet

(52) U.S. Cl.
CPC .. *F17C 2201/035* (2013.01); *F17C 2201/056* (2013.01); *F17C 2203/0333* (2013.01); *F17C 2205/0142* (2013.01); *F17C 2205/0326* (2013.01); *F17C 2221/012* (2013.01); *F17C 2225/0123* (2013.01); *F17C 2225/036* (2013.01); *F17C 2227/0135* (2013.01); *F17C 2227/0157* (2013.01); *F17C 2227/0302* (2013.01); *F17C 2250/03* (2013.01); *F17C 2250/0408* (2013.01); *F17C 2250/043* (2013.01); *F17C 2250/0439* (2013.01); *F17C 2250/0443* (2013.01); *F17C 2250/0636* (2013.01); *F17C 2265/063* (2013.01); *F17C 2265/065* (2013.01); *F17C 2270/0171* (2013.01); *F17C 2270/0178* (2013.01)

(58) Field of Classification Search
CPC ...... F17C 2203/0333; F17C 2205/0142; F17C 2205/0326; F17C 2221/012; F17C 2225/0123; F17C 2225/036; F17C 2270/0171; F17C 2270/0178; F41C 2227/0135; F41C 2227/0157; F41C 2227/0302; F41C 2250/03; F41C 2250/0408; F41C 2250/043; F41C 2250/0439; F41C 2250/0443
USPC .............................................................. 222/1
See application file for complete search history.

(56) References Cited

U.S. PATENT DOCUMENTS

| | | | |
|---|---|---|---|
| 2020/0217456 | A1 | 7/2020 | Francois |
| 2021/0131611 | A1 | 5/2021 | Grandjean |

OTHER PUBLICATIONS

International Search Report in related, co-pending PCT Application No. PCT/FR2022/051087, mailed Sep. 16, 2022.

SYSTEM FOR STORING LIQUID HYDROGEN AND FOR DISTRIBUTING PRESSURISED GASEOUS HYDROGEN

CROSS REFERENCE TO RELATED APPLICATIONS

This application is the 35 U.S.C. § 371 national stage application of PCT Application No. PCT/FR2022/051087, filed Jun. 8, 2022, which application claims the benefit of French Application No. FR 2106014 filed Jun. 8, 2021, both of which are hereby incorporated by reference herein in their entireties.

FIELD OF THE INVENTION

The present invention concerns a system for storing liquid hydrogen and distributing pressurised gaseous hydrogen.

STATE OF THE ART

A system for storing liquid hydrogen and distributing gaseous hydrogen must make it possible to fill tanks to a pressure of 350 or 700 bar or more.

In such a system, liquid hydrogen is typically injected into an expansion tank. Since the walls of the expansion tank are at a temperature higher than that of the liquid hydrogen, said hydrogen vaporises instantly. Therefore, the pressure inside the tank increases rapidly and makes liquid filling difficult.

Such a pressure tank is typically filled by storing gaseous hydrogen and compressing it with multiple compression stages. The installation of different pressure levels is complex and expensive.

Another technique is to use a high pressure liquid compressor. Such a compressor, suitable for supporting high intermediate pressures, is also a complex and expensive component. A system comprising a liquid pump able to compress hydrogen to a pressure of up to approximately 150 bar is presented, for example, in document US 2018/0346313 A1.

DISCLOSURE OF THE INVENTION

One aim of the invention is to provide a system for storing and distributing pressurised gaseous hydrogen comprising a source of liquid hydrogen, an assembly comprising at least two tanks of pressurised gaseous hydrogen to be filled and a transfer device fluidly connected between the liquid hydrogen source and each of said tanks, the transfer device comprising:

- a liquid transfer unit configured to transfer liquid hydrogen from the liquid hydrogen source to any of said tanks, each tank being arranged to transform the liquid hydrogen into pressurised gaseous hydrogen by heating the liquid hydrogen;
- a vapour compressor having a first upstream end fluidly connected to each of said tanks and a second downstream end fluidly connected to each of said tanks;
- a set of valves, such that at least one valve is arranged between each respective tank and the vapour compressor, and
- a control device configured to receive pressure from a tank and, depending on said pressure:
  - to issue a command to the liquid transfer unit in order to transfer liquid hydrogen to said tank to achieve a target level of liquid hydrogen in said tank and
  - to issue a command to open and/or close one or more valves arranged between the vapour compressor and one or more tanks,
- said vapour compressor being arranged so as to transfer hydrogen vapours created during the filling of any tank with liquid hydrogen to each of the other tanks in succession, as a function of the opening and/or closing of the valves, by compressing said vapours to a pressure greater than the pressure of gaseous hydrogen in the tank during filling with liquid hydrogen.

Preferably, the gaseous hydrogen pressure in each tank is between 200 and 1900 bar or more preferably between 200 and 1200 bar.

Advantageously, the liquid transfer unit does not have a liquid compressor.

The invention also relates to a process for storing and distributing pressurised gaseous hydrogen, comprising:

- providing a storage and distribution system as described above,
- filling a first tank with liquid hydrogen by means of the liquid transfer unit (25), the liquid hydrogen being transformed, in said first tank, into pressurised gaseous hydrogen by heating the liquid hydrogen, and
- transferring the hydrogen vapours created during the filling of said first tank with liquid hydrogen to at least one second tank by means of the vapour compressor (10) by compressing said vapours to a pressure greater than the hydrogen pressure in said first tank.

Advantageously, the liquid hydrogen is transformed, in the first tank, into gaseous hydrogen under a pressure of between 200 and 1900 bar or more advantageously between 200 and 1200 bar.

Preferably, the process further comprises a pressure measurement step and/or a temperature measurement step and/or a transferred gas flow measurement step and/or a tank filling measurement step to determine if a target liquid hydrogen filling level is reached in the first tank.

BRIEF DESCRIPTION OF THE FIGURES

Other characteristics and advantages of the invention will result from the detailed description which follows, with reference to the attached drawings, wherein.

DETAILED DESCRIPTION OF EMBODIMENTS

A system for storing liquid hydrogen and distributing gaseous hydrogen according to the invention makes it possible to fill gaseous hydrogen tanks to a pressure of 350 or 700 bar, or to another pressure which can reach 1900 bar, from a quantity of liquid hydrogen. The system transforms liquid hydrogen into gaseous hydrogen by thermal expansion, using a gas compressor to compress the vapours created during the transfer of the liquid hydrogen to an expansion tank 31-35.

Figure 1:
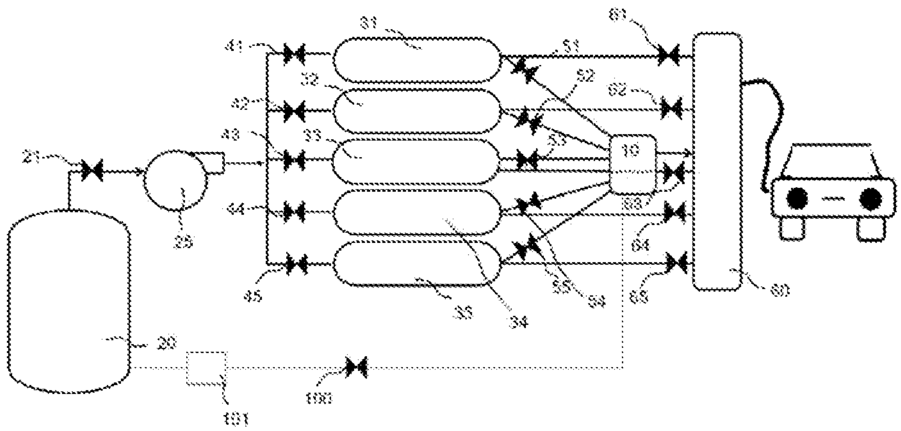
FIG. 1 is a diagram of a system for storing liquid hydrogen and distributing pressurised gaseous hydrogen according to one embodiment of the invention.

FIG. 1 illustrates a system according to the invention comprising a gas compressor 10, a liquid hydrogen tank 20, a set of tanks 31-35 of gaseous hydrogen to be filled, and a liquid transfer unit 25 capable of transferring the liquid hydrogen from the tank 20 to at least one of the tanks 31-35. The number of tanks is indicated for purely illustrative and non-limiting purposes. The number of tanks 31-35 is typically comprised between 2 and 5 and can be higher in some embodiments.

The liquid hydrogen tank 20 includes a pressure relief device 101 making it possible to maintain a constant pressure in the tank 20. Such a pressure relief device is used to regulate the pressure downstream of the valve 100. When the pressure in the tank 20 is too low, the pressure relief device lets gaseous hydrogen pass from the gas compressor to the tank 20.

The system further comprises a certain number of valves 41-45, 51-55 and 61-65 at each inlet and each outlet of the tanks 31-35 to be filled. The tank is thermally insulated and adapted to store a quantity of liquid hydrogen. Tank 20 contains liquid hydrogen at a temperature between 18 K and 27 K at a pressure between 1 and 5 bar.

The liquid transfer unit 25 may typically be a low pressure liquid pump, able to transfer liquid into a container having a substantially identical pressure or with a pressure up to 20% greater than the storage pressure. By way of illustration and non-limiting, the liquid transfer unit 25 may be a centrifugal liquid pump.

In other embodiments, the liquid transfer unit 25 may be another type of pump or a device able to transfer a liquid by a pressure difference, not requiring a pump.

The inlet of said liquid transfer unit 25 is in fluid communication with the liquid hydrogen tank 20 by means of a valve 21.

Each gaseous hydrogen tank 31-35 to be filled has a shape adapted to support the maximum gaseous hydrogen pressure of the system. Said maximum pressure is greater than the pressure used in the application envisaged. For example, if the application envisaged is filling a vehicle tank to a pressure of 700 bar, the maximum pressure of the system is approximately 1900 bar.

Advantageously, the shape of each of the tanks 31-35 is a cylindrical shape with dome-shaped ends. The cylinder can be arranged vertically or horizontally. The volume of each tank 31-35 can be identical.

Alternatively, at least two tanks can have a different volume.

Each tank 31-35 includes thermal insulation to prevent air liquefaction on the outer wall. As a purely illustrative and non-limiting example, such insulation may consist of a layer of polyurethane foam or another thermally insulating foam. Such a layer of foam typically has a thickness of approximately 20 cm.

Each tank 31-35 typically comprises one or more temperature sensors able to measure the temperature inside the tank 31-35, and a pressure sensor able to measure the pressure inside the tank.

Each tank 31-35 comprises a liquid hydrogen valve 41-45 and two gas valves 51-55 and 61-65. Preferably, the gas valves 51-55 and 61-65 are arranged on an upper end of each of the tanks 31-35, for example at the upper dome, when the cylinder is arranged vertically.

The outlet of the liquid transfer unit 25 is in fluid communication with all of the tanks 31-35 by means of a conduit and a respective valve 41-45 for each of the tanks 31-35.

Said vapour inlets/outlets comprising valves 51-55 are in communication with a vapour compressor 10 arranged so as to draw vapour from any tank 31-35 and compress said vapour in any of the other tanks 31-35. The vapour compressor 10 is capable of compressing cold vapours and vapours at ambient temperature, i.e., the temperature surrounding the system (in general, ambient temperature is considered to be between 280 and 300 K). The person skilled in the art will know how to choose a compressor adapted to the size of the system.

The gas inlet/outlet of each of the tanks 31-35 is in fluid communication with a filling station 60 via the respective valves 61-65. The outlet of vapour compressor 10 is also in fluid communication with the station 60. Said filling station 60 comprises a device making it possible to supply an application, for example the tank of a vehicle, with the gaseous hydrogen present in the tanks 31-35. The filling station can be fluidly connected to the hydrogen source via valve 100.

In addition, the filling station 60 typically comprises temperature and pressure sensors, a temperature regulating device, a sensor able to measure the flow rate of the gas transferred and a set of temperature sensors making it possible to measure the filling level in liquid hydrogen. The filling station 60 may also include safety devices for handling pressurised gaseous hydrogen.

The temperature regulation device of the filling station 60 can be simpler than in a conventional filling station. For example, if tanks 31-35 are used at a temperature below ambient temperature, the regulation device does not require cooling means. As a purely illustrative and non-limiting example, the gaseous hydrogen in tanks 31-35 can be used at a temperature of approximately 230 K during filling without being heated to ambient temperature during the compression stages.

The system includes a valve control and regulation device for controlling liquid and vapour transfers between the respective tanks.

Advantageously, the control device comprises at least one processor configured to implement one or more computer programs. The processor is designed to analyse the data measured by the temperature sensors and the pressure sensors arranged in the respective tanks and to control the opening and/or closing of the valves in order to obtain a target pressure in each tank. Said processor is, where appropriate, configured to analyse the data measured by the sensor measuring the flow of gas transferred and the set of sensors making it possible to measure the liquid hydrogen filling level.

The control device can receive a target pressure or target level of liquid hydrogen and target pressures in the tanks. The target pressures in the respective tanks may be identical or different.

The number of tanks 31-35 depends on the use cycle of the filling station 60, especially the quantity of hydrogen to be distributed and the number of daily fillings, the maximum pressures of the tanks (350 or 700 bar or another pressure), the choice of the maximum pressures admissible in the tanks 31-35 and the effective pressure remaining in the tanks of the vehicles to be filled.

The storage and distribution system does not comprise any compressor arranged between the liquid hydrogen source and the gaseous hydrogen tanks 31-35. In particular, the system does not comprise a liquid compressor. This allows gaseous hydrogen to be made available at a lower cost, using less complex components and facilitating system maintenance.

We will now describe the operation of the system for storing and distributing pressurised gaseous hydrogen.

Initially, before filling, tanks 31-35 are at a low pressure, close to 0 or 1 bar. The tank contains liquid hydrogen at a temperature close to −250° C.

A first tank, for example the tank 31, is filled with liquid hydrogen from the tank 20 by means of the liquid transfer unit 25. In this case, valves 21 and 41 are open and valves 42-45 are closed.

Initially, filling is done until the pressures between the liquid hydrogen tank 20 and the tank 31 to be filled are equalised.

Then, the pump 25 and the compressor 10 are put into operation. The valve 100 is open and the pressure relief device 101 is used to maintain a constant pressure in the liquid hydrogen tank 20. The pressure difference between the liquid hydrogen storage tank and the tank 31 being filled is maintained by means of the vapour compressor 10 which draws off the vapour from the tank 31 to one of the tanks 32, 33, 34, and 35, for example tank 32. Thus, the pressure in the tank to be filled is maintained at a constant value between 1 and 5 bar.

If the pressure in the tank 31 becomes greater than 5 bar and is continuously increasing, the control device reduces the flow rate of the pump 25 until the pressure stabilises.

During filling of tank 31, the valve 51 is open to draw off the vapour. Valve 52 is open for compression of the vapour towards tank 32. The vapour compressor 10 is connected so as to have a fluid connection with the tank 31 upstream, and a fluid connection with the tank 32 downstream.

When the tank 32 is filled to a predefined pressure, the control device closes the valve 52. Typically said predefined pressure is between 10 and 200 bar depending on the use profile of the system.

The control device then stops the pump 25 and the compressor 10 and closes all the valves.

The control device then opens the valve 53-55 of another of the tanks 33-35 and draws off the vapour from the tank 31 to said tank, so as to successively fill all the remaining tanks with hydrogen vapour. The vapour compressor 10 is connected so as to have a downstream fluid connection with the tank being filled with vapour drawn from the tank 31.

The valves 52-55 of the tanks filled with hydrogen vapour at the desired pressure, for example 200 bar, are closed when the filling is completed.

When the control device receives a value from one of the filling sensors of the tank 31 that the desired hydrogen level is reached, the filling valve of said tank 31 is closed, the filling with hydrogen is stopped and all the tanks 31 to 35 are hermetically closed. Said liquid level depends on the final pressure desired. For example, for a desired final pressure of 1200 bar, the liquid filling level is approximately 78%. For a maximum pressure of around 1900 bar, the liquid filling level will be close to 100%.

The energy provided by the environment warmer than the cryogenic liquid makes it possible to vaporise the hydrogen and thus to auto-pressurise the tank 31. In the tanks 32-35, an increase in pressure is obtained by the heating of the cold gas present in said tanks following the compression of the cold vapours taken from the tank 31. The gas can be heated to ambient temperature which is typically between 280 and 300 K.

For example, a tank containing cold gaseous hydrogen at a pressure of 200 bar can reach a pressure between 400 and 500 bar at room temperature.

Alternatively, the gas can be partially heated to a temperature below ambient temperature, for example around 230 K. The temperature below ambient temperature can be stabilised and controlled by a suitable device. Alternatively, gaseous hydrogen can be used while the temperature is rising without achieving thermal stabilisation.

Pressurisation Sequence

The control device receives information about the pressure in all the tanks and is configured to control the opening and closing of the valves. When the system receives a threshold value from one of the pressure sensors in one of the tanks 31 to 35, it triggers a subsequent step in a predefined pressurisation sequence.

For example, for a system as shown in FIG. 1, the pressurisation sequence of the tanks 31 to 35 may comprise the following steps, all the valves being initially closed:

- opening the valves 21, 41 and 51 to establish a fluid connection between the source of liquid hydrogen 20 of the pump 25, a first tank 31 and the vapour compressor 10;
- filling with liquid hydrogen from the first tank 31 until the pressures between the tanks 20 and 31 are equalised;
- opening valves 52 and 100 to establish a fluid connection between the vapour compressor 10 and the second tank 32 and between the vapour compressor and the source of liquid hydrogen;
- opening the valve 100 and activation of the pressure relief device 101 to obtain constant pressure in the tank;
- starting the pump 25 to fill the first tank 31 with liquid hydrogen and starting the compressor 10 to transfer the vapour from the first tank 31 to the second tank 32;
- filling the tank 31 while maintaining constant pressure in tank 31;
- if the pressure of the tank 31 becomes greater than 5 bar, reducing the flow rate of the pump 20;
- stopping filling on a level setpoint of the tank 31 at 90%;
- stopping the pump 25 and compressor 10 and closing all valves.

Said sequence is then repeated for filling the tank 32 with activation of the valves 21, 42, 53 and 100. Next, the sequence is executed again for each of the subsequent tanks. The liquid filling level can be programmed to the desired pressure according to Table 1.

TABLE 1

Filling level depending on the desired pressure

| Liquid filling level at 5 bar | Maximum pressure stabilised at 27° C. |
|---|---|
| 90% | 1200 bar |
| 80% | 1000 bar |
| 70% | 807 bar |
| 63.6% | 700 bar |
| 60% | 643 bar |
| 50% | 500 bar |
| 40% | 375 bar |
| 37.8% | 350 bar |
| 30% | 265 bar |
| 20% | 170 bar |
| 10% | 80 bar |

Utilisation

The pressurised gas in tanks 31 and 32-35 can then be used to supply a pressurised gaseous hydrogen application. The gas is supplied by successively equalising the pressure between each of the tanks 31-35 and the tank of the vehicle to be filled, passing through the respective valves 62-65 and the filling station 60. The tank 31-35 with the lowest pressure is used first.

When the equilibrium pressure between said tank 31-35 having the lowest pressure and the vehicle tank is reached, filling is continued from the tank 31-35 having the lowest pressure greater than said equilibrium pressure. Thus, the filling pressure is successively increased and the tank 31-35 with the highest hydrogen pressure is used last. In the remainder of the text, it is assumed that the pressure is increasing from tank 35 to tank 31.

The control device is also used to receive data when filling the tank of an application, and to control the valves during this filling.

A filling sequence for such an application, for example a boat or an automobile, can include the following steps:

- opening the valve 65 and filling the application tank from the tank 35;
- detecting the pressure equilibrium of the application tank and the tank 35;
- closing the valve 65;
- opening the valve 64 and filling the application tank from the tank 34;
- closing the valve 64.

Next, the tanks 33, 32, 31 are used in the same way for filling the application.

If the pressure in one of the tanks 31-35 is greater than the pressure in the application tank, the valve 61-65 corresponding to this tank is opened until the pressures are equalised. This valve 61-65 is then closed.

The hydrogen used to fill the application tank can also be cooled by an exchanger which will exchange thermal energy with a tank in the process of warming.

After dispensing the gaseous hydrogen, the tank with the lowest pressure will be used for refilling with liquid hydrogen.

Before filling, this tank having the lowest pressure is emptied to a pressure below bar by the compressor 10 which is used to transfer the gas from the tank of lower pressure to the second tank of lower pressure.

The vapour is drawn off from said lower-pressure tank by the vapour compressor 10 to the other respective tanks 31-35 consecutively, typically starting with the tank 31-35 having the highest pressure, during filling with liquid hydrogen.

When a tank has a pressure too low for gas distribution use but too high to be filled with liquid from the liquid tank 20, the vapour compressor 10 is used to lower the pressure of said tank and transfer the vapour to a higher pressure tank. When the pressure becomes lower than the pressure of the tank containing the liquid, the liquid can be transferred as in the initial filling.

Thus the tanks 31-35 are filled in turn, when they reach a low pressure so that they can be used for the distribution of gaseous hydrogen.

Such a system can be used to supply a gaseous hydrogen filling station 60 designed to fill vehicle tanks such as trucks, cars or any other vehicle. It allows evaporated gas to be recompressed from liquid hydrogen storage and thus recovering the entire quantity of hydrogen without loss.

Moreover, the system can be used for managing vapours generated when parking a truck comprising a liquid hydrogen tank, for example. During parking for several hours at ambient temperature, partial evaporation of the liquid hydrogen is observed. The vapours generated can be recovered via compression towards one of the tanks and reintroduced into a gaseous hydrogen filling station 60.

In another embodiment, such a distribution system can be used to directly fill the tank of a vehicle with a quantity of liquid hydrogen, using a gas compressor to compress the vapours created during transfer of liquid hydrogen to a buffer tank 70.

Figure 2:
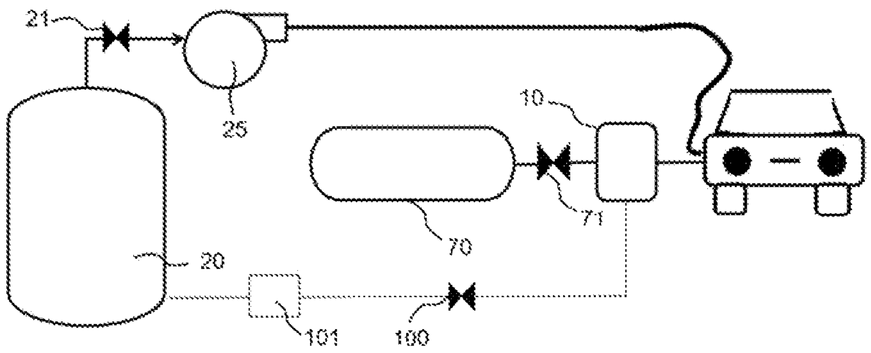
FIG. 2 is a diagram of another system for storing liquid hydrogen and distributing pressurised gaseous hydrogen.

FIG. 2 illustrates a system for storing liquid hydrogen and distributing pressurised gaseous hydrogen according to said embodiment, comprising a source of liquid hydrogen 20, a connection device adapted to be connected to a tank of a vehicle to be filled with liquid hydrogen, said tank being arranged to transform liquid hydrogen into gaseous hydrogen under pressure by heating the liquid hydrogen. Said connection device is adapted to introduce liquid hydrogen into the vehicle tank and to draw off hydrogen vapours from said tank. The system further comprises at least one buffer tank 70 adapted to be filled with gaseous hydrogen, and a transfer device arranged in fluid connection between the source of liquid hydrogen, the connection device, and said at least one tank of gaseous hydrogen to be filled.

The transfer device comprises a liquid transfer unit 25 arranged to transfer liquid hydrogen from the liquid hydrogen source 20 to the vehicle tank via the connection device. The liquid transfer unit 25 may typically be a low pressure liquid pump. Said transfer device further comprises a vapour compressor 10 comprising an inlet fluidly connected with the connection device and an outlet fluidly connected with said at least one buffer tank. Said vapour compressor 10 is arranged so as to transfer hydrogen vapours created during the filling of the vehicle tank with liquid hydrogen to said at least one buffer tank 70, by compressing said vapours to a pressure greater than the pressure of gaseous hydrogen in the vehicle tank during filling with liquid hydrogen.

A filling sequence in such a system may include the following steps:

- determining the pressure in the application tank, the buffer tank 70 and the tank 20;
- if the pressure of the application tank is higher than the pressure of the tank 20 and the pressure in the tank 70 is lower than the pressure of the application tank, opening the valve 71 until the pressure equalises between the buffer tank 70 and the application tank,
- activating the compressor 10 and, as applicable, opening the valve 71 to drain the application tank until reaching a pressure equal to or less than the tank 20 pressure;
- if the pressure of the application tank is lower than the pressure of tank 20, starting pump 25 and compressor 10 with the opening of valves 21 and 71 and valve 100 to the tank 20 and activating the pressure relief device 101 downstream of the valve 100;
- when the liquid filling level of the application tank reaches a predefined value according to Table 2, stopping the filling and closing of all the valves.
- determining the pressure in the application tank, the buffer tank 70 and the tank 20;
- if the pressure of the application tank is higher than the pressure of the tank 20 and the pressure in the tank 70 is lower than the pressure of the application tank, opening the valve 71 until the pressure equalises between the buffer tank 70 and the application tank,
- activating the compressor 10 and, as applicable, opening the valve 71 to drain the application tank until reaching a pressure equal to or less than the tank 20 pressure;
- if the pressure of the application tank is lower than the pressure of tank 20, starting pump 25 and compressor 10 with the opening of valves 21 and 71 and of valve 100 to the tank 20 and activation of pressure relief device 101 downstream of valve 100;
- when the liquid filing level of the application tank reaches a predefined value according to Table 2, stop filing and close all the valves.

TABLE 2

| Filling the tank of an application according to the desired pressure | |
|---|---|
| Liquid filling level at 5 bar | Maximum pressure stabilised at 27° C. |
| 63.6% | 700 bar |
| 50% | 500 bar |
| 37.8% | 350 bar |

The invention claimed is:

1. A system for storing liquid hydrogen and distributing pressurised gaseous hydrogen comprising a source of liquid hydrogen, an assembly comprising at least two tanks of pressurised gaseous hydrogen to be filled and a transfer device fluidly connected between the source of liquid hydrogen and each of said at least two tanks, the transfer device comprising:

a liquid transfer unit configured to transfer liquid hydrogen from the source of liquid hydrogen to any of said tanks, each tank being arranged to transform liquid hydrogen into pressurised gaseous hydrogen by heating the liquid hydrogen, a vapour compressor having a first upstream end fluidly connected to each of said at least two tanks and a second downstream end fluidly connected to each of said at least two tanks, a set of valves, so that at least one valve is arranged between each respective tank and the vapour compressor, and a control device configured to receive pressure from a tank and, depending on said pressure, to issue a command to the liquid transfer unit in order to transfer liquid hydrogen to said tank to achieve a target level of liquid hydrogen in said tank, and to issue a command to open and/or close one or more valves arranged between the vapour compressor and one or more of said at least two tanks, said vapour compressor being arranged so as to transfer hydrogen vapours created during the filling of any tank with liquid hydrogen to each of the other tanks in succession, as a function of the opening and/or closing of the valves, by compressing said vapours to a pressure greater than the pressure of gaseous hydrogen in the tank during filling with liquid hydrogen.

2. The system according to claim 1 wherein the gaseous hydrogen pressure in each tank is between 200 and 1900 bar.

3. The system according to claim 1, wherein the liquid transfer unit does not have a liquid compressor.

4. A process for storing and distributing pressurised gaseous hydrogen, comprising:

providing a storage and distribution system according to claim 1, filling a first tank with liquid hydrogen by means of the liquid transfer unit, the liquid hydrogen being transformed, in said first tank, into pressurized gaseous hydrogen by heating the liquid hydrogen, and transferring the hydrogen vapours created during the filling of said first tank with liquid hydrogen to at least one second tank by means of the vapour compressor by compressing said vapours to a pressure greater than the hydrogen pressure in said first tank.

5. The process for storing and distributing pressurised gaseous hydrogen according to claim 3, wherein the liquid hydrogen is transformed, in the first tank, into gaseous hydrogen under a pressure of between 200 and 1900 bar.

6. The process for storing and distributing pressurised gaseous hydrogen according to claim 3, further comprising measuring at least one of:

a pressure, a temperature, a transferred gas flow, and a tank filling to determine if a target liquid hydrogen filling level is reached in the first tank.

7. The process for storing and distributing pressurised gaseous hydrogen according to claim 3, wherein the liquid hydrogen is transformed, in the first tank, into gaseous hydrogen under a pressure of between 200 and 1200 bar.

8. The system according to claim 1 wherein the gaseous hydrogen pressure in each tank is between 200 and 1200 bar.

* * * * *